(12) United States Patent
Heim et al.

(10) Patent No.: US 6,483,298 B2
(45) Date of Patent: Nov. 19, 2002

(54) TEST SIMULATION OF A READ/WRITE HEAD

(75) Inventors: Kevin R. Heim, Eden Prairie, MN (US); Clifton H. Chang, Bloomington, MN (US); Peter T. Weyandt, Plymouth, MN (US); Patrick J. Ryan, St. Paul, MN (US)

(73) Assignee: Seagate Technology LLC, Scotts Valley, CA (US)

( * ) Notice: Subject to any disclaimer, the term of this patent is extended or adjusted under 35 U.S.C. 154(b) by 0 days.

(21) Appl. No.: 09/872,627

(22) Filed: Jun. 1, 2001

(65) Prior Publication Data

US 2001/0052773 A1 Dec. 20, 2001

Related U.S. Application Data

(60) Provisional application No. 60/208,848, filed on Jun. 2, 2000.

(51) Int. Cl.[7] ........................ G01R 33/12; G11B 5/127
(52) U.S. Cl. ................ 324/210; 324/212; 29/603.11; 29/603.16; 360/320; 360/319
(58) Field of Search ....................... 324/210, 212, 324/202; 365/201; 29/603.01, 603.06, 603.11, 603.13, 603.16; 360/313, 320, 319

(56) References Cited

U.S. PATENT DOCUMENTS

| 4,862,078 A | * | 8/1989 | Kawabata |
| 4,912,883 A | | 4/1990 | Chang et al. .................. 51/165 |
| 5,254,941 A | * | 10/1993 | Osika |
| 5,390,420 A | | 2/1995 | Schultz ........................ 33/286 |
| 5,463,805 A | | 11/1995 | Mowry et al. ................ 29/603 |
| 5,508,614 A | * | 4/1996 | Garfunkel et al. |
| 5,514,953 A | | 5/1996 | Schultz et al. .............. 324/228 |
| 5,557,492 A | * | 9/1996 | Gill et al. |
| 5,559,429 A | | 9/1996 | Mowry et al. ............. 324/71.5 |
| 5,589,777 A | * | 12/1996 | Davis et al. |
| 5,703,485 A | | 12/1997 | Guo et al. ................... 324/235 |
| 5,761,009 A | * | 6/1998 | Hughbanks et al. |
| 5,784,772 A | * | 7/1998 | Ewasko et al. |
| 6,016,692 A | | 1/2000 | Schaenzer et al. ............ 73/105 |
| 6,027,397 A | * | 2/2000 | Church et al. |

FOREIGN PATENT DOCUMENTS

| JP | 11-306519 | * 11/1999 | ............ G11B/5/39 |

* cited by examiner

Primary Examiner—Edward Lefkowitz
Assistant Examiner—Darrell Kinder
(74) Attorney, Agent, or Firm—Westman, Champlin & Kelly, P.A.

(57) ABSTRACT

A test simulation circuit includes a simulated read/write head with a magnet shield and a magnetoresistive sensor exposed at a lapped surface. The test simulation circuit also includes first and second electrical test path connected respectively to the magnet shield and the magnetoresistive sensor. The second electrical test path is electrically isolated from the first electrical test path.

19 Claims, 5 Drawing Sheets

TEST SIMULATION OF A READ/WRITE HEAD

CROSS-REFERENCE TO RELATED APPLICATION

This application claims priority benefits from U.S. Provisional Application No. 60/208,848 titled "Recording head reader-shield isolation lap monitor," filed Jun. 2, 2000.

FIELD OF THE INVENTION

The present invention relates to disc drive data storage devices. In particular, the present invention relates to testing of a simulated read/write head for disc drive data storage devices.

BACKGROUND OF THE INVENTION

The condition or quality of an air bearing surface of a read/write head is important to the performance and life expectancy of the head. In particular, contamination of the surface that results in reduced electrical isolation between a magnetoresistive sensor and a magnetic shield can degrade head performance. Known methods for contamination testing include obtaining electron microphotographs of the air bearing surface or measuring electrical isolation using a hand probe to contact the magnetic shield. Electron microphotographs do not reliably predict electrical isolation and hand probing becomes increasingly difficult as the dimensions of the shield have become smaller and harder to contact with a hand probe.

An apparatus and method are needed for conveniently measuring the electrical isolation between a magnetoresistive sensor and a magnetic shield on a read/write head for a disc drive.

SUMMARY OF THE INVENTION

Disclosed are a test simulation circuit and a method of forming such a circuit. The test simulation circuit includes a simulated read/write head having a magnet shield and a magnetoresistive sensor that are exposed at a lapped surface of the simulated read/write head. The test simulation circuit includes a first electrical test path including a first bonding pad and a first internal connection connected to the magnetoresistive sensor. The test simulation circuit also includes a second electrical test path including a second bonding pad and a second internal connection connected to the magnet shield, the second electrical test path being electrically isolated from the first electrical test path.

Electrical isolation at the lapped surface can be tested using the first and second electrical test paths. Hand probing the lapped surface can be avoided. Electrical isolation testing can be performed while the lapped surface is being lapped. Additional features and benefits will become apparent with a careful review of the following drawings and the corresponding detailed description.

DETAILED DESCRIPTION

With the present invention, electrical isolation at a lapped surface of a simulated read/write head can be tested using electrical test paths that pass through the simulated read/write head.

A test simulation circuit includes a simulated read/write head having a magnet shield and a magnetoresistive sensor that are exposed at a lapped surface of the simulated read/write head. The test simulation circuit includes a first electrical test path including a first bonding pad and a first internal connection connected to the magnetoresistive sensor. The test simulation circuit also includes a second electrical test path including a second bonding pad and a second internal connection connected to the magnet shield, the second electrical test path being electrically isolated from the first electrical test path. Test connections are made to the bonding pads. Hand probing the lapped surface can be avoided and electrical isolation testing of the lapped surface can be performed while the lapped surface is being lapped.

Figure 1:
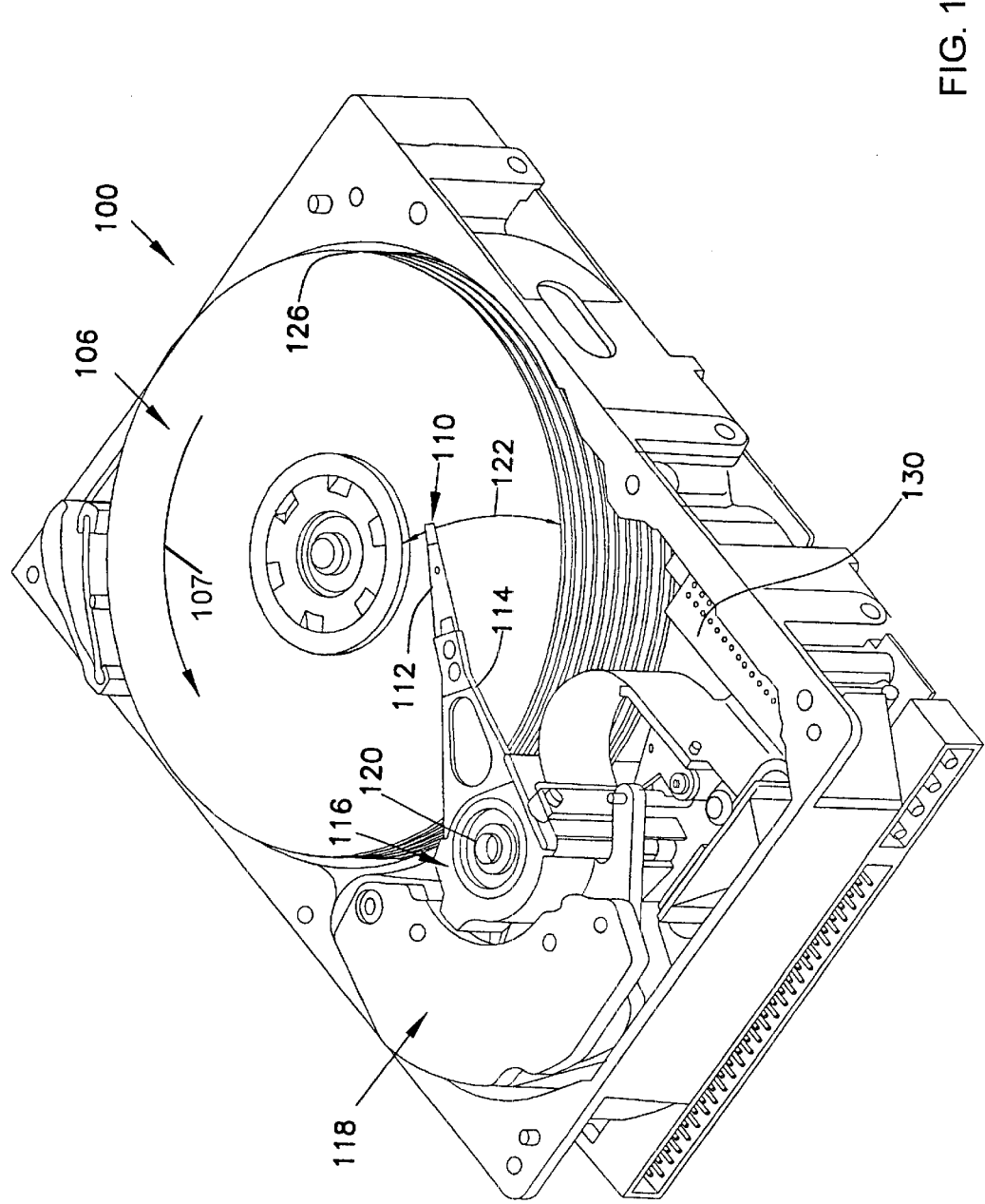
FIG. 1 illustrates a disc drive storage device.

In FIG. 1, an embodiment of a disc drive 100 is illustrated. Disc drive 100 includes a disc pack 126 having storage surfaces 106 that are typically layers of magnetic material. The disc pack 126 includes a stack of multiple discs and a read/write head assembly 112 includes a read/write head or slider 110 for each surface. Read/write head 110 is a functional read/write head used for reading and writing data. Disc pack 126 is spun or rotated as shown by arrow 107 to allow read/write head assembly 112 to access different rotational locations for data on the storage surfaces 106 on the disc pack 126.

Read/write head assembly 112 is actuated to move radially, relative to the disc pack 126, as shown by arrow 122 to access different radial locations for data on the storage surfaces 106 of disc pack 126. Typically, the actuation of read/write head assembly 112 is provided by a voice coil motor 118. Voice coil motor 118 includes a rotor 116 that pivots on axle 120 and an arm 114 that actuates the read/write head assembly 112. Read/write head assembly 112 also typically includes microactuators that operate in cooperation with voice coil motor 118 to track or follow tracks recorded on storage surfaces 106 using servo control techniques. Disc drive 100 includes electronic circuitry 130 for controlling the operation of the disc drive 100 and transferring data in and out of the disc drive 100.

Figure 2:
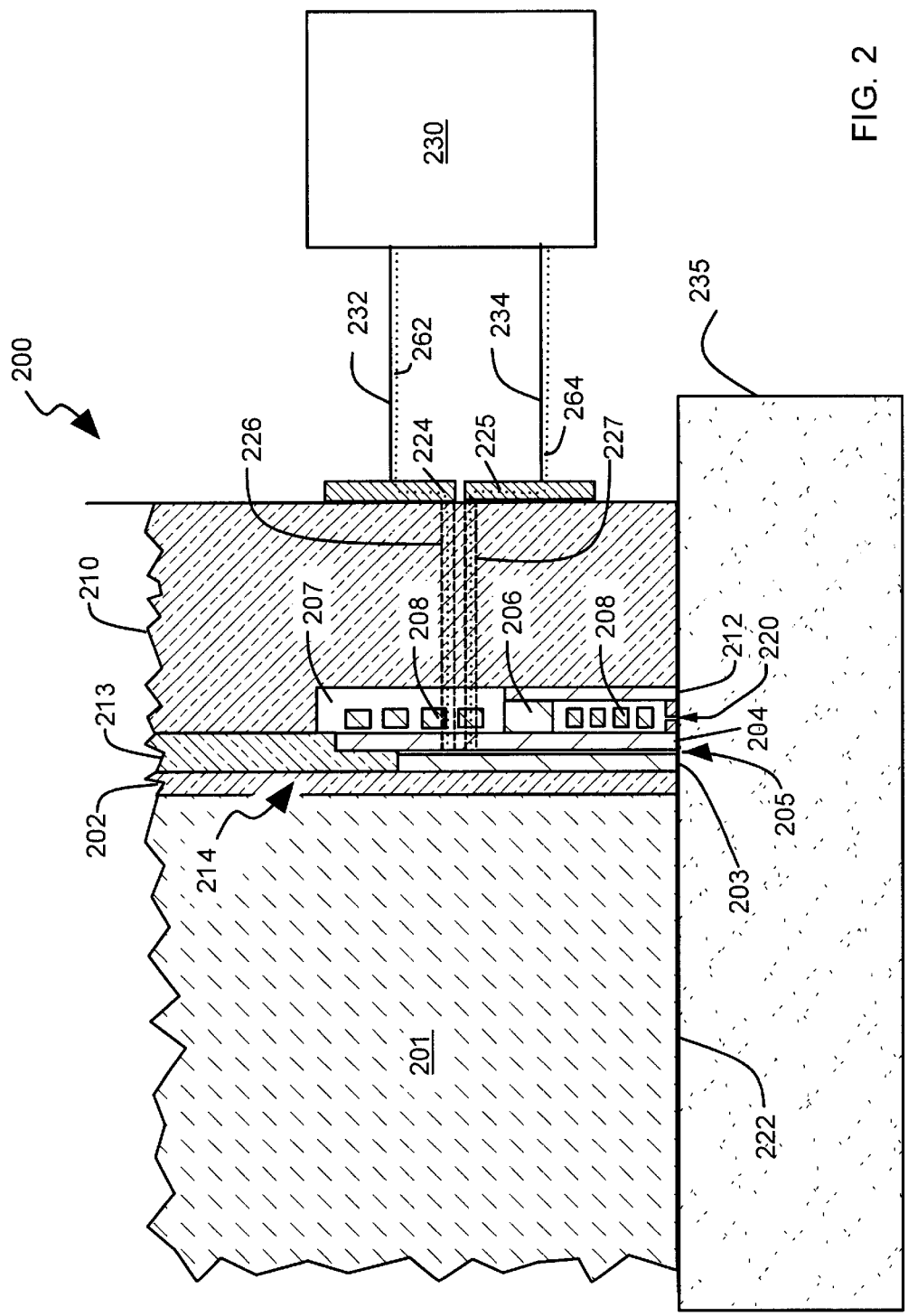
FIG. 2 illustrates a simulated read/write head connected to an electrical isolation test instrument by way of electrical test paths.

FIG. 2 illustrates a test simulation circuit 200 which includes a simulated read/write head 214 formed on a substrate 201 of a disc drive slider. Head 214 is typically formed using thin film processing techniques. Simulated read/write head 214 includes a first insulating layer 202 and a second insulating layer 213 that are typically formed of aluminum oxide $Al_2O_3$. A first magnetic shield 203 also called a lower shield is deposited on the first insulating layer 202. A series of reader layers 205 are then deposited on the lower shield 203. The reader layers 205 are illustrated in more detail below in FIG. 4. A second magnetic shield 204 also called an upper shield or shared pole is deposited over the reader layers 205, which include reader insulating layers for electrical isolation. A write coil 208 is deposited over the shared pole 204 and surrounded by a write coil insulator layer 207, which is typically an organic material. A magnetic core 206 goes through the center of the write coil 208. A write magnetic layer 212 is then deposited over the magnetic core 206. A write gap 220 is formed between the shared pole 204 and the write magnetic layer 212.

In the simulated read/write head 214, a lapped surfaced 222 closely simulates a lapped surface of a functional read/write head such as head 110 illustrated in FIG. 1. Lapped surface 222 is placed in contact with a lapping apparatus 235 in order to lap the surface 222 and adjust the throat height of the write gap 220 and/or the stripe height of a magnetoresistive sensor (250 described in FIG. 3 below) in layer 205. The simulated read/write head 214 has connections that are made to bonding pads 224 and 225 formed at an external surface of a topping layer 210. Topping layer 210 is also typically aluminum oxide. The first bonding pad 225 is connected by a bonding pad via 227 to the reader layers 205. The second bonding pad 224 is connected to the reader layers 205 by a bonding pad via 226. An electrical isolation test instrument 230 is connected by leads 232, 234 to the bonding pads 224, 225 as illustrated in FIG. 2. The connections between bonding pad vias 226, 227 and the reader layers 205 are illustrated in more detail below in FIG. 3. The magnetic shields 203 and 204 and the magnetoresistive sensor 250 are exposed at a lapped surface 222 of the simulated read/write head 214. A first electrical test path 264 (illustrated with a dotted line) includes the first bonding pad 225 and a first internal connection 240 (illustrated in FIG. 3) connected to the magnetoresistive sensor 250. A second electrical test path 262 illustrated with a dotted line) includes the second bonding pad 224 and a second internal connection 252 (FIG. 3) connected to the lower shield 203. The second electrical test path 262 is electrically isolated from the first electrical test path 264.

Figure 3:
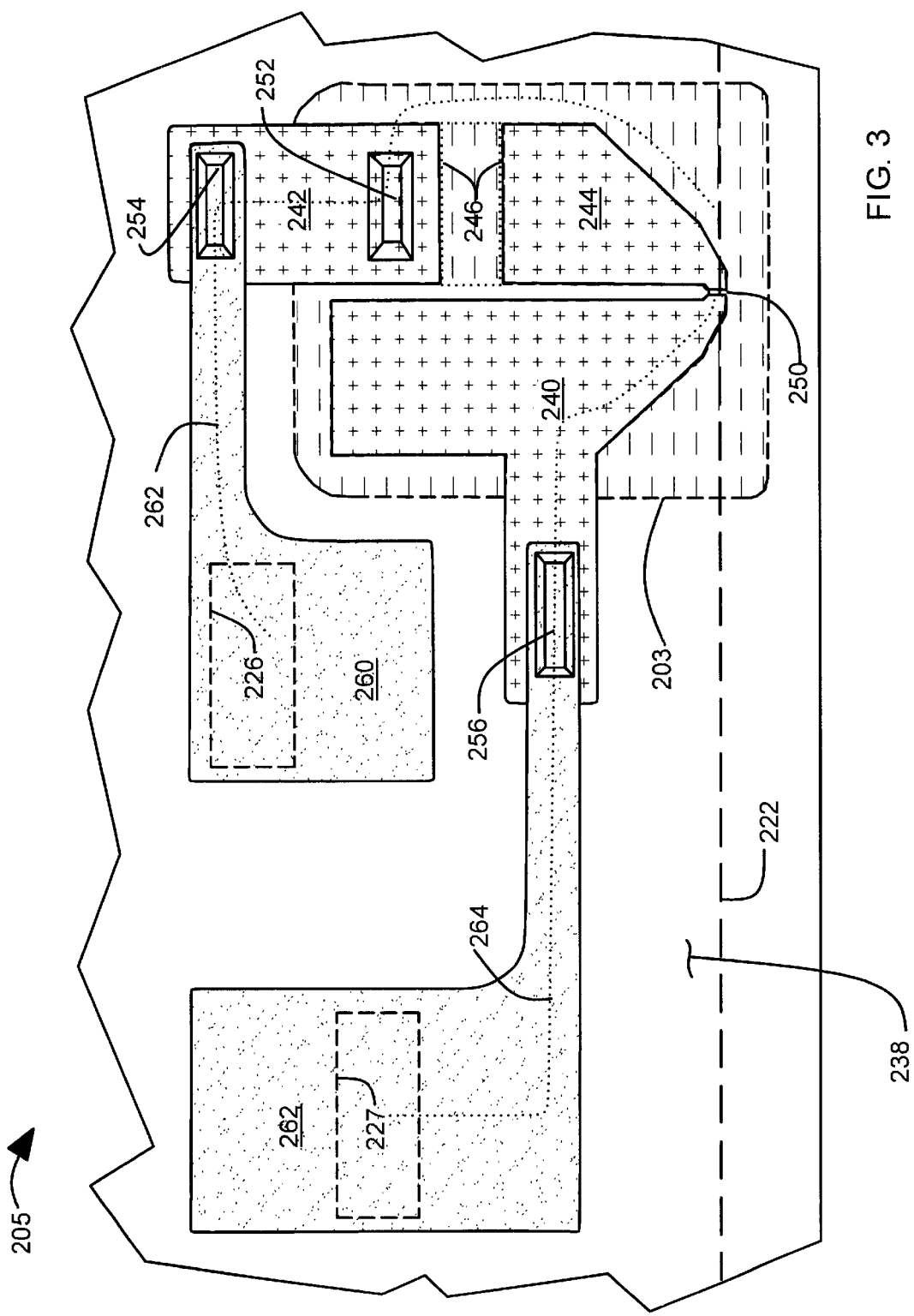
FIG. 3 illustrates details of a sensor contact layer in a simulated read/write head.

FIG. 3 illustrates the reader layers 205 in more detail. A group of reader gap layers 238 are deposited over the lower shield 203. The lower shield 203 is illustrated in dashed lines in FIG. 3. The reader gap layers 238 are typically formed of electrically insulating material. A sensor contact layers 240, 242, 244 is deposited between the reader gap layers 238. The sensor contact layers 240, 242, 244 are formed of an electrically conducting metallization. Sensor contact layer 240 forms a first internal connection to the magnetoresistive sensor 250. The sensor contact layer 244 is also connected to the magnetoresistive sensor 250, however, the sensor contact layer 244 is separated by a break or gap 246 (see FIG. 3) from sensor contact layer 242. The break or gap 246 is formed by a mask feature when the sensor contact layers 240, 242, 244 are deposited. The gap 246 provides electrical isolation between the first internal connection 240 and the sensor contact layer 242. The gap 246 is not present in a functional read/write head. The sensor contact layer 242 is connected by a via 252 to the lower shield 203. The via 252 passes through intervening reader gap layers 238. The sensor contact layer 242 is connected through another via 254 to a bonding pad 260. Bonding pad 260 is connected by bonding pad via 226 to the external bonding pad 224 (FIG. 2). There is thus a second electrical test path 262 that includes the bonding pad 224 and connects through bonding pad via 226, bond pad 260, via 254, sensor contact layer 242 and second internal connection or via 252 to the lower shield 203. The first internal connection 240 is connected by a via 256 to bond pad 262. The bond pad 262 connects by way of bond pad via 227 to the first bonding pad 225, which is external to the simulated read/write head 214. A first electrical test path 264 is thus completed from the bonding pad 225 through the bonding pad via 227, bond pad 262, via 256 and sensor contact layer 240 to the magnetoresistive sensor 250. The first electrical test path 264 and the second electrical test path 262 are thus electrically isolated from each other internal to the simulated read/write head 214.

With these connections, measurement instrument 230 can test for contaminants on the lapped surface 222 between magnetoresistive sensor 250 and lower shield 203 without the use of hand probes at the lapped surface 222. Since there are no probes applied to lapped surface 222, electrical isolation testing can be performed while the lapping fixture 235 is in use.

Figure 4:
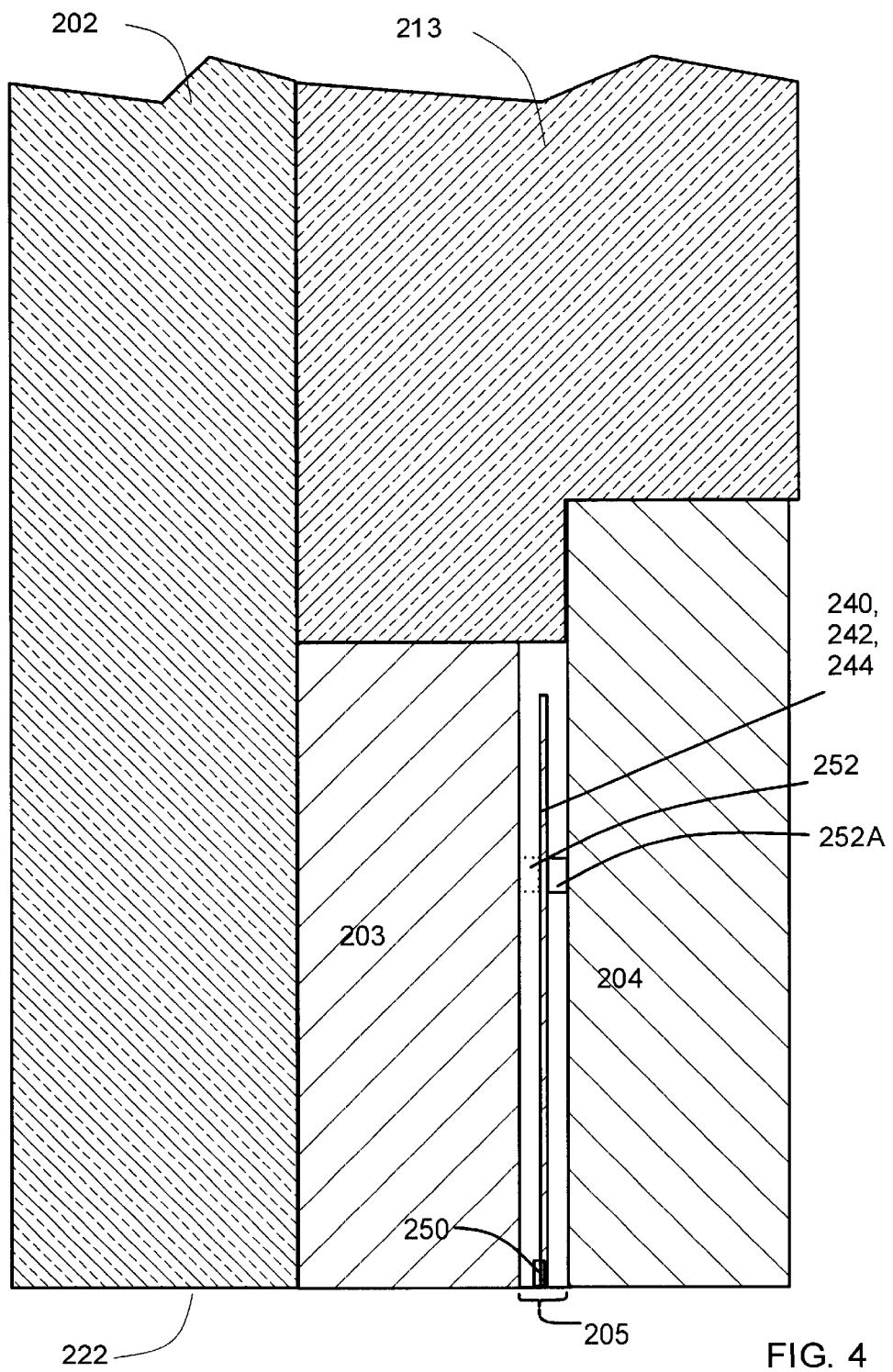
FIG. 4 illustrates an alternative simulated read/write head with test connections to a shared pole.

FIG. 4 illustrates an alternative embodiment similar to that in FIGS. 2 and 3. The reference numerals used in FIG. 4 are the same as reference numerals used in FIGS. 2 and 3. In FIG. 4, the via 252, which serves as a second internal connection at dotted location 252 has been moved to an alternative location 252A to provide an electrical connection to the shared pole 204 rather than the lower shield 203. This arrangement provides for testing of electrical isolation between the shared pole 204 and magnetoresistive sensor 250. In other respects, the sensor illustrated in FIG. 4 is the same or similar to that illustrated in FIGS. 2 and 3.

It is also contemplated, for some applications to include both via 252 and via 252A in a simulated read/write head. With this arrangement of two vias 252, 252A, contamination between the magnetoresistive sensor 250 and either lower shield 203 or upper shield 204 can both be measured. Depending on the needs of the application, vias and test connections can be made to test for contamination between the magnetoresistor 250 and the lower pole 203, between the magnetoresistor and the shared pole 204, or both the lower pole 203 and the shared pole 204, individually, sequentially or simultaneously.

Figure 5:
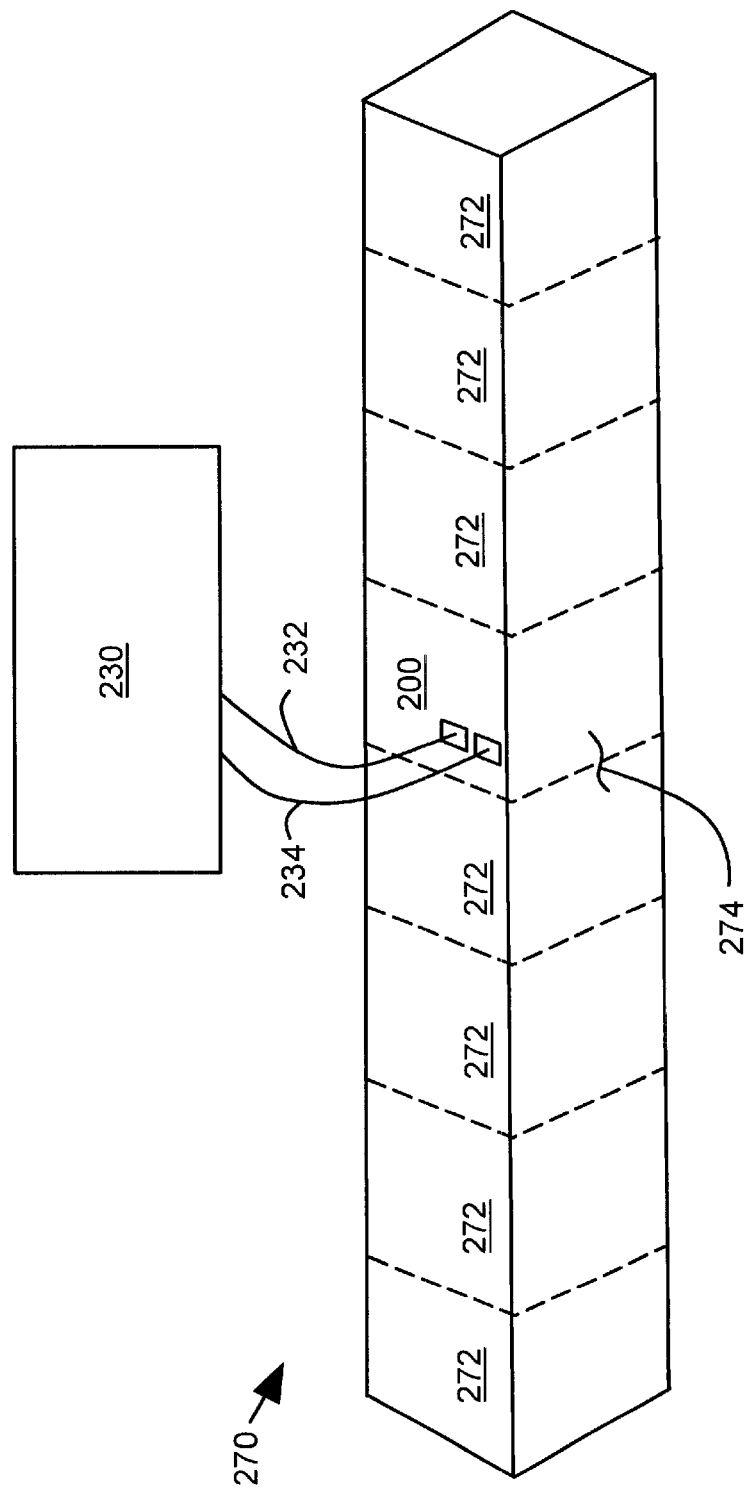
FIG. 5 illustrates a substrate included a simulated read/write heads and an array of functional read/write heads.

In FIG. 5, one application for the test simulation circuit 200 is illustrated. In FIG. 5, a substrate 270 includes a number of functional read/write heads 272 as well as a simulated read/write head 200. The functional read/write head 272 and the simulated read/write head 200 share a common lapped surface 274. The functional read/write heads 272 and the simulated read/write head 200 have substantially the same construction, except that gap 246 (FIG. 3) and via 252 (FIG. 3) are included in the simulated read/write head 200. When the functional read/write heads 272 are lapped, the simulated read/write head 200 can be used to monitor the quality of the lapped surface 274 while the lapping operation is on-going. The simulated read/write head 200 is connected by leads 233, 234 to an electrical isolation test apparatus 230 as illustrated. The electrical test apparatus 230 can be a commercially available instrument that measures an electrical isolation characteristic such as resistance, impedance, capacitance, leakage current or breakdown voltage, depending on the needs of the application.

Electrical isolation at the lapped surface can be tested using the first and second electrical test paths. Hand probing the lapped surface can be avoided. Electrical isolation testing can be performed while the lapped surface is being lapped.

Testing can be performed using the simulated read/write head at wafer level, slider level, or head-gimbal assembly level of production, and under the same geometric conditions as a functional read/write head. The simulated read/write head can be used for research to test, quantify and improve lapping processes. Smearing of magnetic shields can be detected at each step in the manufacturing and testing process. Ordinary measurement instruments such as a multimeter can be used and connected by convenient wire bonding to the external bonding pads on the simulated read/write head. The arrangement can also be used to measure the capacitance and/or leakage of the deposited insulating layers in the read/write head. The simulated read/write head also gives an indication of when a process clears a previously formed smear on the lapped surface. Electrostatic discharge generated by the lapping process can also be observed using the simulated read/write head. Hardness of the lapped surface can also be performed by applying a scratch load to the lapped surface and testing for electrical leakage.

In summary, a test simulation circuit (200) includes a simulated read/write head (214) having a magnet shield (203 or 204) and a magnetoresistive sensor (250) that are exposed at a lapped surface (222) of the simulated read/write head (214). The test simulation circuit (200) includes a first electrical test path (264) including a first bonding pad (225) and a first internal connection (240) connected to the magnetoresistive sensor (250). The test simulation circuit (200) also includes a second electrical test path (262) including a second bonding pad (224) and a second internal connection (252) connected to the magnet shield (203, 204 or both 203 and 204). The second electrical test path (262) is electrically isolated from the first electrical test path (264) by the gap (246).

It is to be understood that even though numerous characteristics and advantages of various embodiments of the invention have been set forth in the foregoing description, together with details of the structure and function of various embodiments of the invention, this disclosure is illustrative only, and changes may be made in detail, especially in matters of structure and arrangement of parts within the principles of the present invention to the full extent indicated by the broad general meaning of the terms in which the appended claims are expressed. For example, the particular elements may vary depending on the particular application for the disc drive head while maintaining substantially the same functionality without departing from the scope and spirit of the present invention. In addition, although the preferred embodiment described herein is directed to a read/write head for a disc drive system, it will be appreciated by those skilled in the art that the teachings of the present invention can be applied to other systems, like heads for tape drives or magneto-optic storage systems, without departing from the scope and spirit of the present invention.

What is claimed is:

1. A test simulation circuit, comprising:
    a simulated read/write head having a magnet shield and a magnetoresistive sensor that are exposed at a lapped surface of the simulated read/write head;
    a first electrical test path including a first bonding pad and a first internal connection connected to the magnetoresistive sensor; and
    a second electrical test path including a second bonding pad and a second internal connection connected to the magnet shield, the second electrical test path being electrically isolated from the first electrical test path.

2. The test simulation circuit of claim 1 wherein the simulated read/write head further comprises a sensor contact layer that is a portion of the both the first and second electrical test paths, the sensor contact layer having a gap that electrically isolates the first electrical test path from the second electrical test path.

3. The test simulation circuit of claim 1, further comprising an electrical isolation test instrument connected to the first and second bonding pads.

4. The test simulation circuit of claim 3 wherein the isolation test instrument measures at least one electrical isolation characteristic of the simulated read/write head selected from the group: resistance, reactance, capacitance, leakage current and breakdown voltage.

5. The test simulation circuit of claim 3 further comprising a lapping apparatus in contact with the lapped surface.

6. The test simulation circuit of claim 1 wherein the magnet shield is a lower shield.

7. The test simulation circuit of claim 1 wherein the magnet shield is a shared pole.

8. The test simulation circuit of claim 1 wherein the simulated read/write head is a thin film head.

9. The test simulation circuit of claim 1, further comprising an array of functional read/write heads arranged together on a substrate with the simulated read/write head.

10. A method of forming a test simulation circuit, comprising:
    providing a simulated read/write head having a magnet shield and a magnetoresistive sensor that are exposed at a lapped surface of the simulated read/write head;
    connecting a first electrical test path including a first bonding pad and a first internal connection to the magnetoresistive sensor;
    connecting a second electrical test path including a second bonding pad and a second internal connection to the magnet shield; and
    electrically isolating the second electrical test path from the first electrical test path.

11. The method of claim 10, further comprising:
    providing a sensor contact layer that is a portion of the both the first and second electrical test paths, and
    providing a gap in the sensor contact layer to electrically isolate the first electrical test path from the second electrical test path.

12. The method of claim 10, further comprising connecting an electrical isolation test instrument to the first and second bonding pads.

13. The method of claim 12, further comprising:
    measuring at least one electrical isolation characteristic of the simulated read/write head selected from the group: resistance, capacitance, leakage current and breakdown voltage.

14. The method of claim 12 further comprising:
    contacting the lapped surface with a lapping apparatus.

15. The method of claim 10 wherein the magnet shield is a lower shield.

16. The method of claim 10 wherein the magnet shield is a shared pole.

17. The method of claim 10 wherein the simulated read/write head is a thin film head.

18. The method of claim 10, further comprising:
    arranging the simulated read/write head on a substrate with an array of functional read/write heads.

19. A test simulation circuit, comprising:
    a simulated read/write head having a magnet shield and a magnetoresistive sensor that are exposed at a lapped surface of the simulated read/write head and a contact layer that is a portion of first and second electrical test paths, the contact layer including gap means for electrically isolating the first electrical test path from the second electrical test path; and
    an electrical isolation test instrument coupled to the first and second electrical test paths.

* * * * *